United States Patent
Zhang et al.

(10) Patent No.: US 8,433,107 B1
(45) Date of Patent: Apr. 30, 2013

(54) METHOD OF ENHANCING A NOSE AREA OF AN IMAGE AND RELATED COMPUTING DEVICE

(75) Inventors: HuaQi Zhang, Hangzhou (CN); Jin Wang, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 13/338,272

(22) Filed: Dec. 28, 2011

(51) Int. Cl.
*G06K 9/00* (2006.01)
*G06K 9/40* (2006.01)
*G06G 5/00* (2006.01)

(52) U.S. Cl.
USPC ............ 382/118; 382/274; 345/581; 345/619

(58) Field of Classification Search .................. 382/115, 382/118, 167, 254, 274; 358/531; 345/581, 345/619, 694
See application file for complete search history.

(56) References Cited

U.S. PATENT DOCUMENTS

| | | | | |
|---|---|---|---|---|
| 5,835,616 | A * | 11/1998 | Lobo et al. ..................... | 382/118 |
| 6,826,312 | B1 * | 11/2004 | Takemura ..................... | 382/282 |
| 7,082,211 | B2 * | 7/2006 | Simon et al. .................. | 382/118 |
| 7,469,072 | B2 * | 12/2008 | Yano ............................. | 382/274 |
| 7,796,787 | B2 * | 9/2010 | Wang et al. ................... | 382/118 |
| 8,265,410 | B1 * | 9/2012 | Konoplev ..................... | 382/254 |
| 2003/0223622 | A1 * | 12/2003 | Simon et al. .................. | 382/118 |
| 2007/0292001 | A1 * | 12/2007 | Baba et al. ..................... | 382/118 |
| 2009/0196475 | A1 * | 8/2009 | Demirli et al. ................ | 382/128 |
| 2011/0084962 | A1 * | 4/2011 | Kim et al. ..................... | 345/419 |
| 2011/0091113 | A1 * | 4/2011 | Ito et al. ........................ | 382/197 |
| 2012/0177288 | A1 * | 7/2012 | Chaussat et al. .............. | 382/165 |

OTHER PUBLICATIONS

Bui, T.D.; Heylen, D.; Nijholt, A.; , "Improvements on a simple muscle-based 3D face for realistic facial expressions," Computer Animation and Social Agents, 2003. 16th International Conference on , vol., No., pp. 33-40, May 8-9, 2003.*

* cited by examiner

*Primary Examiner* — Andrae A Allison
(74) *Attorney, Agent, or Firm* — Winston Hsu; Scott Margo

(57) ABSTRACT

A method of enhancing a nose area of an image containing a face with a nose visible on the face includes loading the image into a computing device having a processor. The processor defines the nose area on the image, the nose area including a highlighted region corresponding to a middle of the nose, a first shaded region being located on a left side of the nose and bordering the left side of the nose, and a second shaded region being located on a right side of the nose and bordering the right side of the nose. The processor next performs an image enhancement process on the image to create an enhanced image, the image enhancement process including increasing the brightness of the highlighted region and decreasing the brightness of the first shaded region and the second shaded region. The processor then outputs the enhanced image.

16 Claims, 3 Drawing Sheets

METHOD OF ENHANCING A NOSE AREA OF AN IMAGE AND RELATED COMPUTING DEVICE

BACKGROUND OF THE INVENTION

1. Field of the Invention

The invention relates to image enhancement, and more particularly, to a method of enhancing a nose area of an image containing a face with a nose visible on the face.

2. Description of the Prior Art

With the increasing popularity of computing devices, including desktop computers, notebook computers, tablet computers, and even mobile phones, users often wish to send and receive pictures to other users. For instance, a mobile phone user may wish to take a self-portrait picture with a camera of the computing device, and then share the picture with others. The picture can be shared via electronic mail (email), a video chat program, or even through social networking sites such as Facebook®.

However, users often wish to make pictures appear more lifelike before they share the pictures with others. As a result, there exists a need for an easy way to enable users to enhance images in order to make the images appear more lifelike.

SUMMARY OF THE INVENTION

It is therefore one of the primary objectives of the claimed invention to provide a method and computing device for enhancing a nose area of an image of containing a face in order to make the face appear more real and lifelike.

According to an exemplary embodiment of the claimed invention, a method of enhancing a nose area of an image containing a face with a nose visible on the face is disclosed. The method includes loading the image into a computing device having a processor. The processor defines the nose area on the image, the nose area including a highlighted region corresponding to a middle of the nose, a first shaded region being located on a left side of the nose and bordering the left side of the nose, and a second shaded region being located on a right side of the nose and bordering the right side of the nose. The processor next performs an image enhancement process on the image to create an enhanced image, the image enhancement process including increasing the brightness of the highlighted region and decreasing the brightness of the first shaded region and the second shaded region. The processor then outputs the enhanced image.

According to another exemplary embodiment of the claimed invention, a computing device for enhancing a nose area of an image containing a face with a nose visible on the face is disclosed. The computing device includes a memory for storing the image and a processor for loading the image and defining the nose area on the image, the nose area including a highlighted region corresponding to a middle of the nose, a first shaded region being located on a left side of the nose and bordering the left side of the nose, and a second shaded region being located on a right side of the nose and bordering the right side of the nose. The processor next performs an image enhancement process on the image to create an enhanced image, the image enhancement process including increasing the brightness of the highlighted region and decreasing the brightness of the first shaded region and the second shaded region. The processor then outputs the enhanced image.

It is an advantage that the present invention provides a simple and efficient method of enhancing an image of a face to make the face appear more real and lifelike by adjusting the brightness of the nose area. Through the simple brightness adjustment the face can appear more three-dimensional through the use of shading and brightening.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
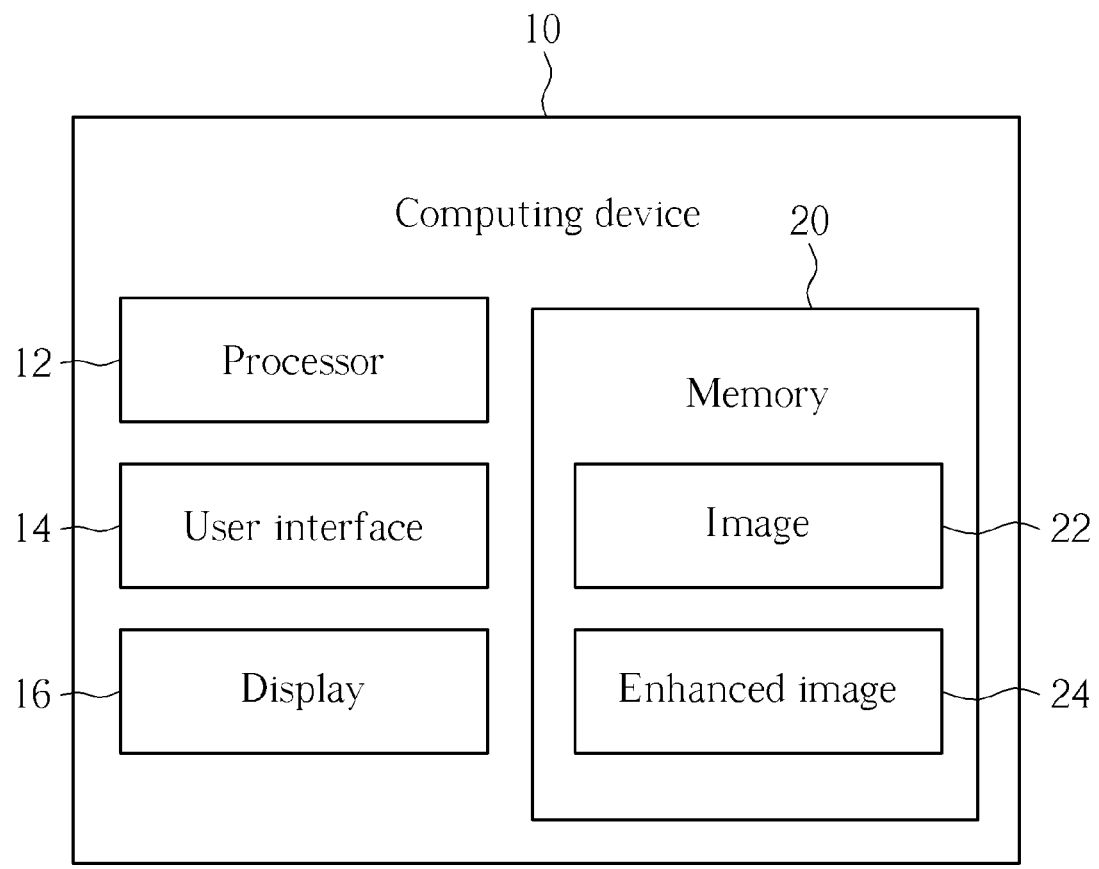
FIG. 1 is a functional block diagram of a computing device according to the present invention.

Please refer to FIG. 1. FIG. 1 is a functional block diagram of a computing device 10 according to the present invention. The computing device 10 contains a processor 12 for controlling operation of the computing device 10 and for executing commands for the computing device 10, a user interface 14 for enabling a user to use the computing device 10, a display 16 for displaying images, and a memory 20. The memory can store at least one image 22 as well as at least one enhanced image 24. The processor 12 can execute image enhancing processes in order to convert the image 22 into the enhanced image 24.

Figure 2:
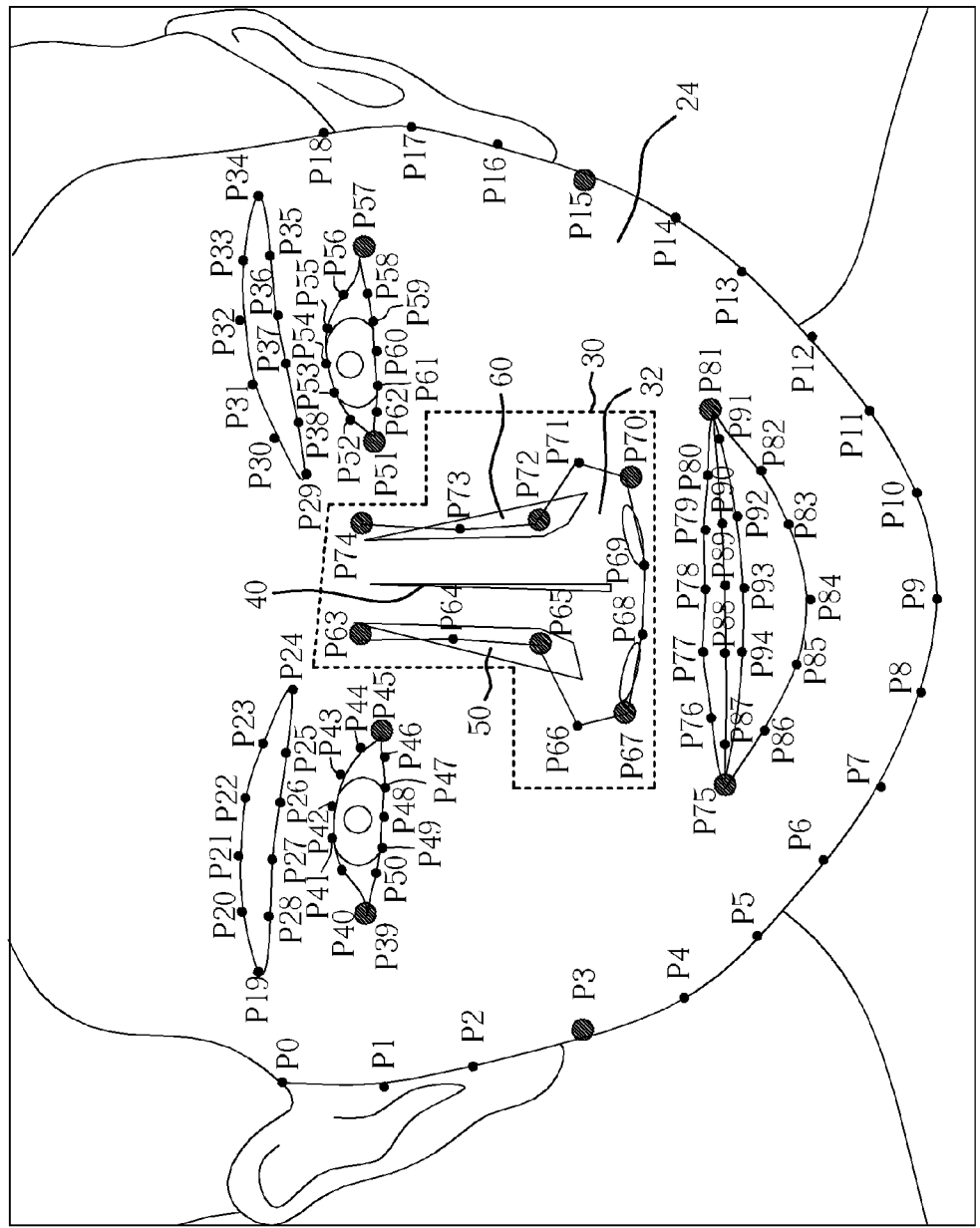
FIG. 2 illustrates the image containing a face with a nose visible on the face.

Please refer to FIG. 2. FIG. 2 illustrates the image 22 containing a face 24 with a nose 32 visible on the face 24. A series of feature points P0-P94 are used to outline various features of the face 24. For the purposes of the present invention, the feature points P63-P74 are of concern for defining a nose area 30. Although each of the feature points P63-P74 can be used for defining the nose area 30, in actuality, at a minimum only the feature points P63, P65, P67, P70, P72, and P74 are needed to define the nose area 30.

In order to make the face 24 appear more real and lifelike, the present invention performs brightness adjustment on the nose area 30 in order to give the impression of the nose area 30 being three-dimensional.

First of all, after the nose area 30 has been defined using the feature points P63, P65, P67, P70, P72, and P74, a highlighted region 40, a first shaded region 50, and a second shaded region 60 are defined. The highlighted region 40 is located at a middle position of the nose 32 and extends vertically from the top of the nose 32 to the bottom of the nose 32, the first shaded region 50 is located on a left side of the nose 32 and bordering the left side of the nose 32, and the second shaded region 60 is located on a right side of the nose 32 and bordering the right side of the nose 32. The first shaded region 50 and the second shaded region 60 extend vertically, and are substantially parallel to the highlighted region 40.

In order to make the nose area 30 and the face 24 appear more three-dimensional, the brightness of each of the highlighted region 40, the first shaded region 50, and the second shaded region 60 will be adjusted in a brightness adjustment step to be described below. After the brightness adjustment step is performed for creating the enhanced image 24, the highlighted region 40 will have an increased brightness, whereas the first shaded region 50 and the second shaded region 60 will have a decreased brightness. Thus, the enhanced image 24 has a more prominent three-dimensional effect than that of the image 22 without any enhancement.

As illustrated in FIG. 2, areas of each of the highlighted region 40, the first shaded region 50, and the second shaded region 60 can be defined using at least one polygon. After the polygons of the highlighted region 40 are filled in for defining the highlighted region 40, the polygons undergo a Gaussian blurring process, also known as a Gaussian smoothing process, in order to create a smooth transition from the highlighted region 40 to adjacent regions of the nose area 30. The resulting polygons treated with the Gaussian blurring process create a first mask. Similarly, the first shaded region 50 is filled with polygons and treated with a Gaussian blurring process create a second mask. Next, the second shaded region 60 is filled with polygons and treated with a Gaussian blurring process create a third mask. The first, second, and third masks will be used in the brightness adjustment processes for respectively altering the brightness of the highlighted region 40, the first shaded region 50, and the second shaded region 60.

The sequence of adjusting the brightness for the highlighted region 40, the first shaded region 50, and the second shaded region 60 can be switched. That is, the brightness of the highlighted region 40 can be increased first followed by decreasing the brightness of the first shaded region 50 and the second shaded region 60. Alternatively, the brightness of the first shaded region 50 and the second shaded region 60 can be decreased first followed by increasing the brightness of the highlighted region 40.

The brightness of each pixel in each of the highlighted region 40, the first shaded region 50, and the second shaded region 60 can be adjusted using equation (1) as follows:

$$P_{new}=[P_{orig}*(255-mask_{val})+P_{adj}*mask_{val}]/255 \quad (1)$$

where $P_{new}$ represents a new brightness level of a pixel being adjusted after the brightness adjustment, $P_{orig}$ represents an original brightness level of the pixel being adjusted before the brightness adjustment, $P_{adj}$ represents a recommended adjusted brightness level of the pixel being adjusted according to a brightness curve for the region undergoing the brightness adjustment, and $mask_{val}$ represents a transparency value of the mask being applied, and $P_{new}$, $P_{orig}$, $P_{adj}$, and $mask_{val}$ have values between 0 and 255, inclusive.

A different brightness curve is used for the highlighted region 40 than for the first shaded region 50 and the second shaded region 60. The brightness curve for the highlighted region 40 provides values of the recommended adjusted brightness level $P_{adj}$ that are higher than the values of the original brightness level $P_{orig}$. The opposite is true for the brightness curves for the first shaded region 50 and the second shaded region 60. That is, the brightness curves for the first shaded region 50 and the second shaded region 60 provides values of the recommended adjusted brightness level $P_{adj}$ that are lower than the values of the original brightness level $P_{orig}$.

The recommended values of the brightness level $P_{adj}$ along with the value $mask_{val}$ of the mask being applied at the location of each pixel determines how much of an adjustment the new brightness level $P_{new}$ will be compared with the original brightness level $P_{orig}$.

It should be noted that only the brightness of each pixel is adjusted, but not the color values of the pixels. In the present invention, only the nose area 30 needs to undergo a brightness adjustment process. However, other parts of the face 24 can also be adjusted as well.

Figure 3:
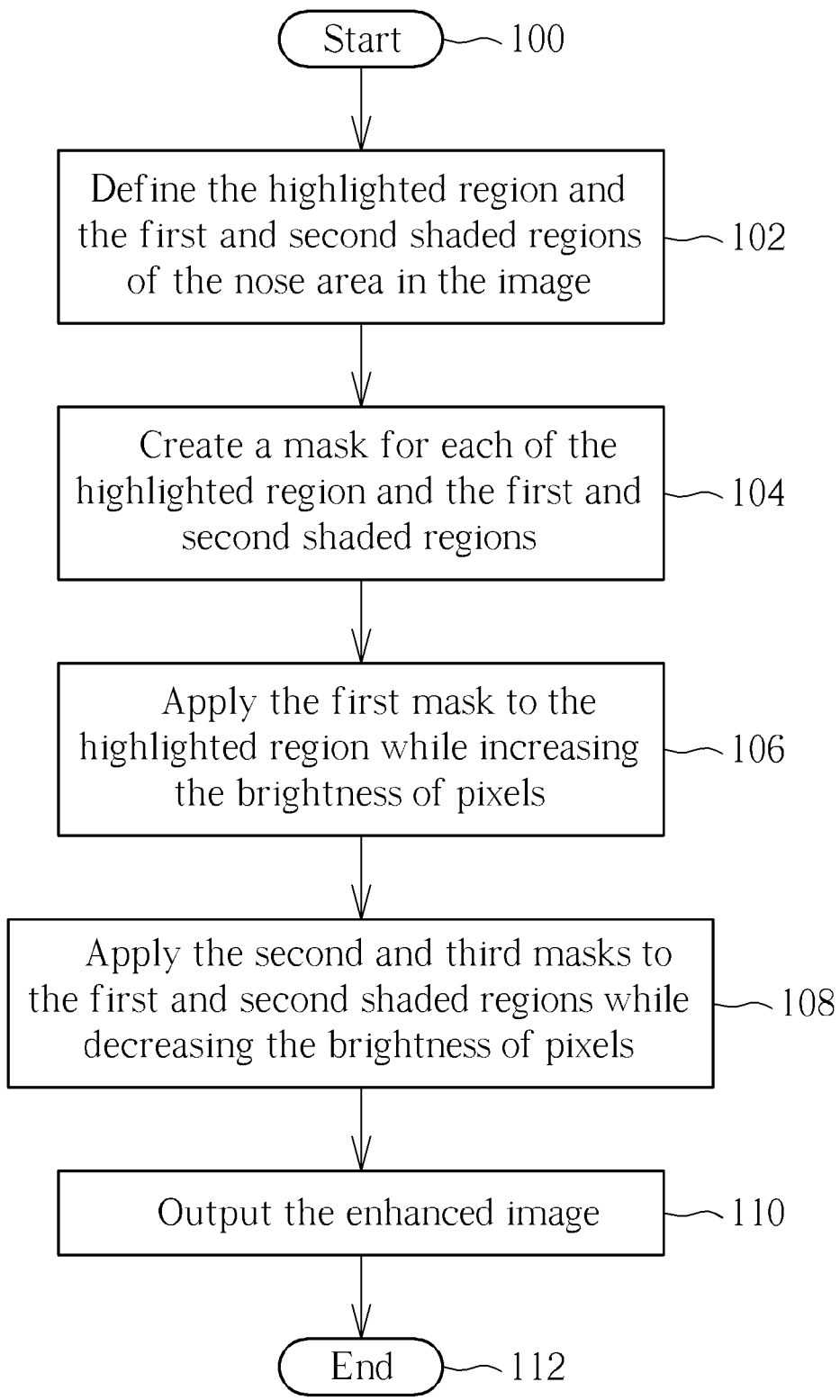
FIG. 3 is a flowchart describing the method of enhancing a nose area according to the present invention.

Please refer to FIG. 3. FIG. 3 is a flowchart describing the method of enhancing the nose area 30 according to the present invention.

Steps in the flowchart will be explained as follows.

Step 100: Start.

Step 102: Define the highlighted region 40, the first shaded region 50, and the second shaded region 60 of the nose area in the image 22.

Step 104: Create a first mask for the highlighted region 40, a second mask for the first shaded region 50, and a third mask for the second shaded region 60. The masks are created by filled polygons that undergo a Gaussian blurring process.

Step 106: Apply the first mask to the highlighted region 40 while increasing the brightness of the pixels in the highlighted region 40.

Step 108: Apply the second mask and the third mask to first shaded region 50 and the second shaded region 60, respectively, while decreasing the brightness of the pixels in the first shaded region 50 and the second shaded region 60.

Step 110: Output the enhanced image 24.

Step 112: End.

The present invention can be implemented in any kind of computing device 10 such as a desktop computer, a notebook computer, a tablet computer, and a personal digital assistant (PDA), and a mobile phone. Any computing device 10 that has a memory for storing images and a processor for executing the image enhancement process can be used with the present invention enhancement method. Furthermore, the present invention can enhance not only images obtained from photographs, but also can enhance computer generated images.

In summary, the present invention provides a simple and efficient method of enhancing an image of a face to make the face appear more real and lifelike by adjusting the brightness of the nose area. The use of shading and brightening can make the face appear more three-dimensional and realistic.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing a nose area of an image containing a face with a nose visible on the face, the method comprising:
    loading the image into a computing device having a processor, the processor executing the following steps:
        defining the nose area on the image, the nose area comprising a highlighted region corresponding to a middle of the nose, a first shaded region being located on a left side of the nose and bordering the left side of the nose, and a second shaded region being located on a right side of the nose and bordering the right side of the nose;
        performing an image enhancement process on the image to create an enhanced image, the image enhancement process comprising:
            increasing the brightness of the highlighted region; and
            decreasing the brightness of the first shaded region and the second shaded region; and
        outputting the enhanced image.

2. The method of claim 1, wherein the image enhancement process further comprises:
    defining an area of the highlighted region using at least one polygon to generate a first mask corresponding to the highlighted region;
    defining an area of the first shaded region using at least one polygon to generate a second mask corresponding to the first shaded region;

defining an area of the second shaded region using at least one polygon to generate a third mask corresponding to the second shaded region;

increasing the brightness of the highlighted region while applying the first mask;

decreasing the brightness of the first shaded region while applying the second mask; and decreasing the brightness of the second shaded region while applying the third mask.

3. The method of claim 2, wherein generating the first mask further comprises performing a Gaussian blur on the at least one polygon of the first mask to create a smoothing effect for the first mask, generating the second mask further comprises performing a Gaussian blur on the at least one polygon of the second mask to create a smoothing effect for the second mask, and generating the third mask further comprises performing a Gaussian blur on the at least one polygon of the third mask to create a smoothing effect for the third mask.

4. The method of claim 2, wherein increasing the brightness of the highlighted region while applying the first mask, decreasing the brightness of the first shaded region while applying the second mask, and decreasing the brightness of the second shaded region while applying the third mask are all performed according to the equation $$P_{new}=[P_{orig}*(255-\text{mask}_{val})+P_{adj}*\text{mask}_{val}]/255$$

wherein $P_{new}$ represents a new brightness level of a pixel being adjusted after a brightness adjustment, $P_{orig}$ represents an original brightness level of the pixel being adjusted before the brightness adjustment, $P_{adj}$ represents a recommended adjusted brightness level of the pixel being adjusted according to a brightness curve for the region undergoing the brightness adjustment, and $\text{mask}_{val}$ represents a value of the mask being applied, and $P_{new}$, $P_{orig}$, $P_{adj}$, and $\text{mask}_{val}$ have values between 0 and 255, inclusive.

5. The method of claim 1, wherein increasing the brightness of the highlighted region is performed before decreasing the brightness of the first shaded region and the second shaded region.

6. The method of claim 1, wherein decreasing the brightness of the first shaded region and the second shaded region is performed before increasing the brightness of the highlighted region.

7. The method of claim 1, wherein the highlighted region corresponds to the middle of the nose and extends vertically from the top of the nose to the bottom of the nose.

8. The method of claim 7, wherein the first shaded region and the second shaded region extend vertically and are substantially parallel to the highlighted region.

9. A computing device for enhancing a nose area of an image containing a face with a nose visible on the face, the computing device comprising:

a memory for storing the image; and a processor for loading the image and executing the following steps:

defining the nose area on the image, the nose area comprising a highlighted region corresponding to a middle of the nose, a first shaded region being located on a left side of the nose and bordering the left side of the nose, and a second shaded region being located on a right side of the nose and bordering the right side of the nose;

performing an image enhancement process on the image to create an enhanced image, the image enhancement process comprising:

increasing the brightness of the highlighted region; and decreasing the brightness of the first shaded region and the second shaded region; and outputting the enhanced image.

10. The computing device of claim 9, wherein the image enhancement process further comprises:

defining an area of the highlighted region using at least one polygon to generate a first mask corresponding to the highlighted region;

defining an area of the first shaded region using at least one polygon to generate a second mask corresponding to the first shaded region;

defining an area of the second shaded region using at least one polygon to generate a third mask corresponding to the second shaded region;

increasing the brightness of the highlighted region while applying the first mask;

decreasing the brightness of the first shaded region while applying the second mask; and decreasing the brightness of the second shaded region while applying the third mask.

11. The computing device of claim 10, wherein generating the first mask further comprises performing a Gaussian blur on the at least one polygon of the first mask to create a smoothing effect for the first mask, generating the second mask further comprises performing a Gaussian blur on the at least one polygon of the second mask to create a smoothing effect for the second mask, and generating the third mask further comprises performing a Gaussian blur on the at least one polygon of the third mask to create a smoothing effect for the third mask.

12. The computing device of claim 10, wherein increasing the brightness of the highlighted region while applying the first mask, decreasing the brightness of the first shaded region while applying the second mask, and decreasing the brightness of the second shaded region while applying the third mask are all performed according to the equation $$P_{new}=[P_{orig}*(255-\text{mask}_{val})+P_{adj}*\text{mask}_{val}]/255$$

wherein $P_{new}$ represents a new brightness level of a pixel being adjusted after a brightness adjustment, $P_{orig}$ represents an original brightness level of the pixel being adjusted before the brightness adjustment, $P_{adj}$ represents a recommended adjusted brightness level of the pixel being adjusted according to a brightness curve for the region undergoing the brightness adjustment, and $\text{mask}_{val}$ represents a value of the mask being applied, and $P_{new}$, $P_{orig}$, $P_{adj}$, and $\text{mask}_{val}$ have values between 0 and 255, inclusive.

13. The computing device of claim 9, wherein increasing the brightness of the highlighted region is performed before decreasing the brightness of the first shaded region and the second shaded region.

14. The computing device of claim 9, wherein decreasing the brightness of the first shaded region and the second shaded region is performed before increasing the brightness of the highlighted region.

15. The computing device of claim 9, wherein the highlighted region corresponds to the middle of the nose and extends vertically from the top of the nose to the bottom of the nose.

16. The computing device of claim 15, wherein the first shaded region and the second shaded region extend vertically and are substantially parallel to the highlighted region.

* * * * *